(12) United States Patent
Tolkacz et al.

(10) Patent No.: US 8,858,391 B2
(45) Date of Patent: Oct. 14, 2014

(54) DOG CLUTCH WITH SYNCHRONIZER AND METHOD

(75) Inventors: Joseph M. Tolkacz, Novi, MI (US);
Shawn H. Swales, Canton, MI (US);
Min-Joong Kim, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 164 days.

(21) Appl. No.: 13/563,835

(22) Filed: Aug. 1, 2012

(65) Prior Publication Data

US 2013/0281242 A1    Oct. 24, 2013

Related U.S. Application Data

(60) Provisional application No. 61/625,970, filed on Apr. 18, 2012.

(51) Int. Cl.
*B60W 10/02* (2006.01)

(52) U.S. Cl.
USPC ............................. 477/5; 475/198; 180/65.22

(58) Field of Classification Search
USPC .......... 477/5, 3, 6; 475/198, 5, 199, 200, 201; 180/65.22, 65.21, 65.1
See application file for complete search history.

(56) References Cited

U.S. PATENT DOCUMENTS

| 7,628,728 | B2* | 12/2009 | Soliman et al. | 477/5 |
| 7,678,013 | B2* | 3/2010 | Soliman et al. | 477/5 |
| 7,691,027 | B2* | 4/2010 | Soliman et al. | 477/5 |
| 7,695,401 | B2* | 4/2010 | Soliman et al. | 477/5 |
| 7,722,499 | B2* | 5/2010 | Soliman et al. | 477/5 |
| 7,806,802 | B2* | 10/2010 | Silveri et al. | 477/5 |
| 7,828,694 | B2* | 11/2010 | Silveri et al. | 477/3 |
| 2011/0275470 | A1* | 11/2011 | Ekonen et al. | 475/198 |

* cited by examiner

*Primary Examiner* — Saul Rodriguez
*Assistant Examiner* — David J Hlavka
(74) *Attorney, Agent, or Firm* — Quinn Law Group, PLLC (57) ABSTRACT

A transmission disconnect clutch assembly and method are provided. The clutch assembly operates to place the transmission in a low-loss state, by decoupling the base transmission from the differential gearing, thereby maximizing fuel economy and increasing efficiency. The transmission disconnect clutch assembly may be a dog clutch assembly, which may include a dog clutch hub, a clutch apply plate, and a synchronizer. When the dog clutch is disengaged the vehicle may operate in EV mode, propelled by an electric motor and rear e-axle. When the dog clutch is engaged the vehicle may operate in hybrid mode, propelled by torque transmitted to a front axle by an engine and the torque transmitted to the rear e-axle by the electric motor. A method for transitioning a vehicle between EV mode and hybrid mode, as well as a method for transitioning a vehicle between hybrid mode and EV mode are also provided.

18 Claims, 5 Drawing Sheets

DOG CLUTCH WITH SYNCHRONIZER AND METHOD

CROSS REFERENCE TO RELATED APPLICATIONS

This application claims the benefit of U.S. Provisional Application No. 61/625,970, filed Apr. 18, 2012, which is hereby incorporated by reference in its entirety.

TECHNICAL FIELD

The disclosure relates to a dog clutch, operable as a transmission disconnect clutch, coupled with a synchronizer and method.

BACKGROUND

Passenger and commercial vehicles, including hybrid vehicles, use various clutches to transfer torque between two or more vehicle components. In some hybrid vehicles, clutches may be used to transfer torque generated by the engine and/or one or more motors to a front or rear vehicle axle of the vehicle, to propel the vehicle. Multiple clutches may be used to allow the hybrid vehicle to operate in various operating modes, namely electric only mode (EV mode), engine only mode, and hybrid mode.

In some hybrid architectures, it is advantageous, in order to increase the efficiency and maximize fuel economy, to place the transmission in a low loss state. This low loss state may be achieved by decoupling the transmission from the differential gearing. This decoupling may be achieved by disengaging all clutches that transfer torque generated by an engine and/or one or more motors to the front or rear axle of the vehicle.

SUMMARY

A dog clutch assembly for use in a hybrid vehicle is provided. The dog clutch assembly may include a dog clutch that is operable as a transmission disconnect clutch and a synchronizer.

An example front-wheel drive vehicle includes a front axle, which may have a conventional engine, conventional automatic or manual transmission, and a belt alternator starter motor (BAS), and a rear, electronically-controlled e-axle powered by power electronics with gearing.

In electric only operating mode (EV mode) and in silent start, the example vehicle is propelled by the rear axle alone with the electric power of an electric motor and an on board vehicle battery. In hybrid mode, the example vehicle is propelled by the front axle, powered by the conventional engine, transmission, and an electric BAS motor.

The dog clutch assembly is configured to engage or disengage during a transition from a present operating mode to a target operating mode, by a signal from a controller, such as a hybrid control unit. The controller may indicate an initiation event, which can include a driver induced acceleration request, a torque threshold event, or a battery depletion event. When transferring from EV mode to hybrid mode, the clutch assembly may be engaged to couple a base transmission, which includes a plurality of transmission range clutches, gears, and shafts, with a front differential; when transferring from hybrid drive mode to EV mode, the clutch assembly may be disengaged, thereby decoupling the base transmission from the front differential.

The dog clutch assembly may include a dog clutch and synchronizer. The dog clutch may include a dog clutch hub and a dog clutch apply plate. Each of the respective dog clutch hub and dog clutch apply plate may include axially extending mechanical engagement features, such as teeth. The teeth of the dog clutch hub may be configured to mechanically engage the teeth of the dog clutch apply plate.

When an initiation event signaling a change in operating mode from EV mode to hybrid drive mode is identified, the synchronizer may engage and synchronize the relative rotational speeds of the components of the base transmission and the front differential, creating a coasting or quasi-neutral gear state. When sufficient speed synchronization is achieved, a clutch-apply mechanism is configured to engage and axially displace the dog clutch apply plate until the teeth of the dog clutch apply plate are mechanically engaged with the teeth of the dog clutch hub, thereby fully engaging the clutch assembly and coupling the base transmission and the front differential.

When an initiation event is detected, and a change in operating mode from hybrid drive mode to EV mode is signaled, the clutch apply mechanism energizes and axially displaces the dog clutch apply plate, thereby releasing and disengaging the dog clutch, and decoupling the base transmission from the front differential.

A method of transitioning a hybrid vehicle between a present operating mode and a target operating mode is provided. The method comprises the steps of detecting an oncoming initiation event based on a transition from the present operating mode to the target operating mode, wherein the present operating mode is an EV operating mode and the target operating mode is a hybrid operating mode; signaling a desired change from the present operating mode to the target operating mode; applying a synchronizer to synchronize a base transmission and a front differential, wherein the base transmission includes a plurality of range clutches, gears, and shafts; starting a BAS motor to crank an engine; engaging a dog clutch assembly to selectively couple the base transmission with the front differential; engaging the base transmission; and powering the front differential in the target operating mode with the engine.

A method of transitioning a hybrid vehicle between a present operating mode and a target operating mode is also provided. The method comprises the steps of detecting an oncoming initiation event based on a transition from a present operating mode to a target operating mode, wherein the present operating mode is a hybrid operating mode and the target operating mode is an EV operating mode; signaling a desired change from the present operating mode to the target operating mode; reducing the torque output of an engine to zero and increasing the torque output of an electric motor; disengaging a base transmission, wherein the base transmission includes a plurality of range clutches, gears, and shafts; cutting fuel to the engine; reducing the speed of the engine to zero using a BAS motor; disengaging a dog clutch assembly to decouple the base transmission and a front differential; powering a rear differential in the target operating mode with the electric motor.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Referring to the Figures, wherein like reference numbers correspond to like or similar components throughout the several views, a dog clutch assembly 150 for use in a hybrid vehicle 100 is provided. The dog clutch assembly 150 may include a dog clutch 154, 155 that is operable as a transmission disconnect clutch and a synchronizer 153.

Figure 1:
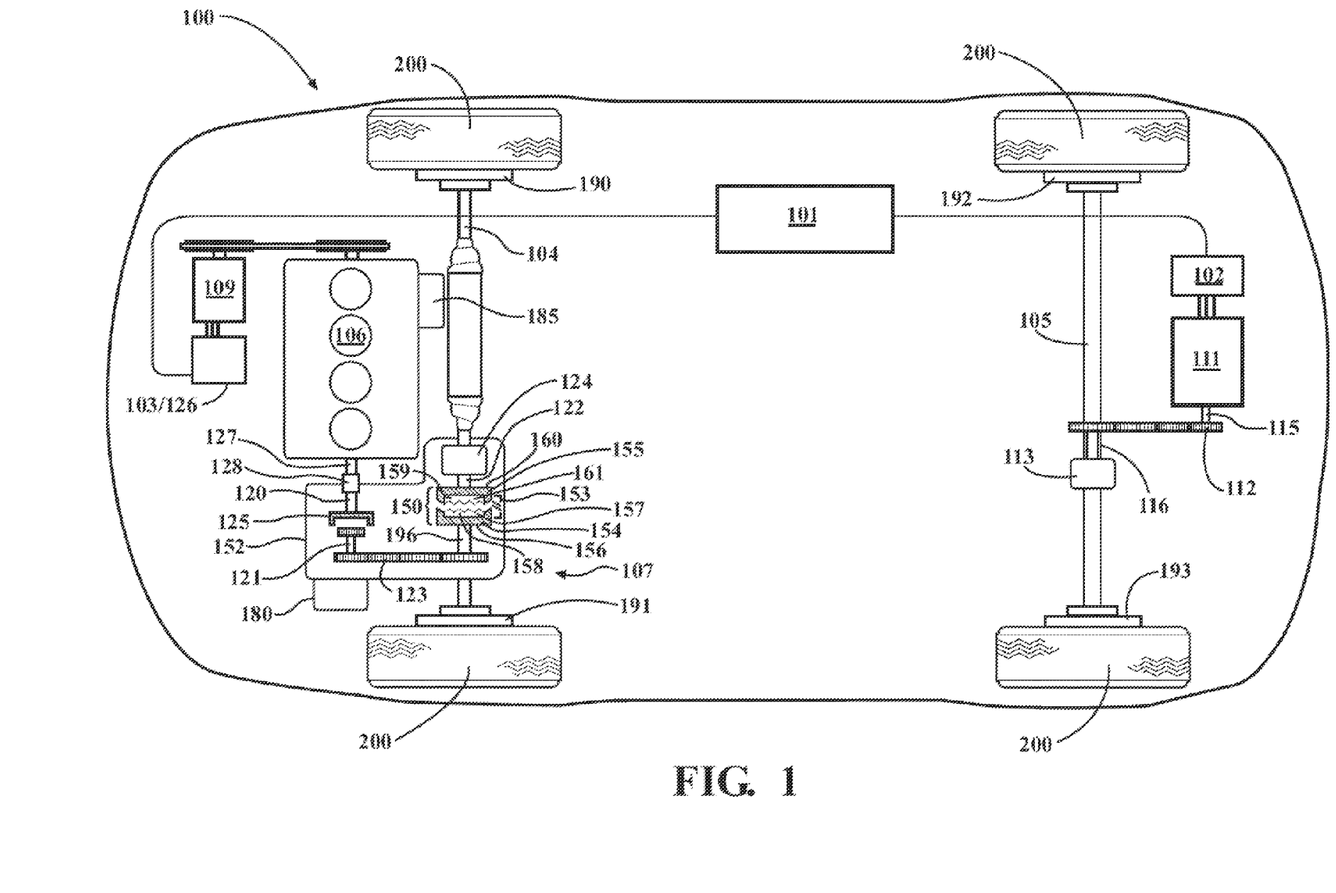
FIG. 1 is an aerial schematic view of a vehicle including a first example configuration of the disconnect clutch with a synchronizer.
Figure 2:
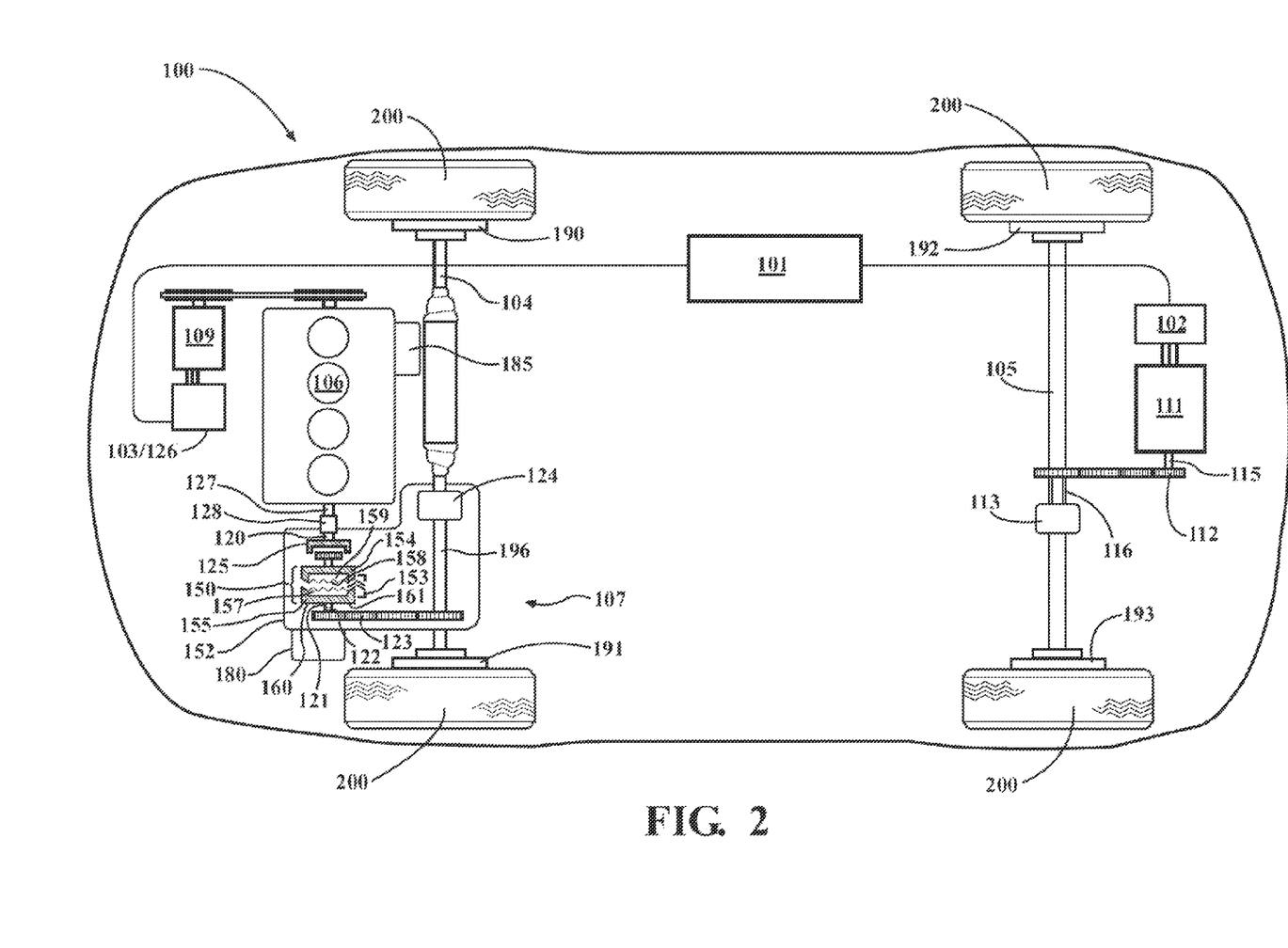
FIG. 2 is an aerial schematic view of a vehicle including a second example configuration of the disconnect clutch with a synchronizer.
Figure 3:
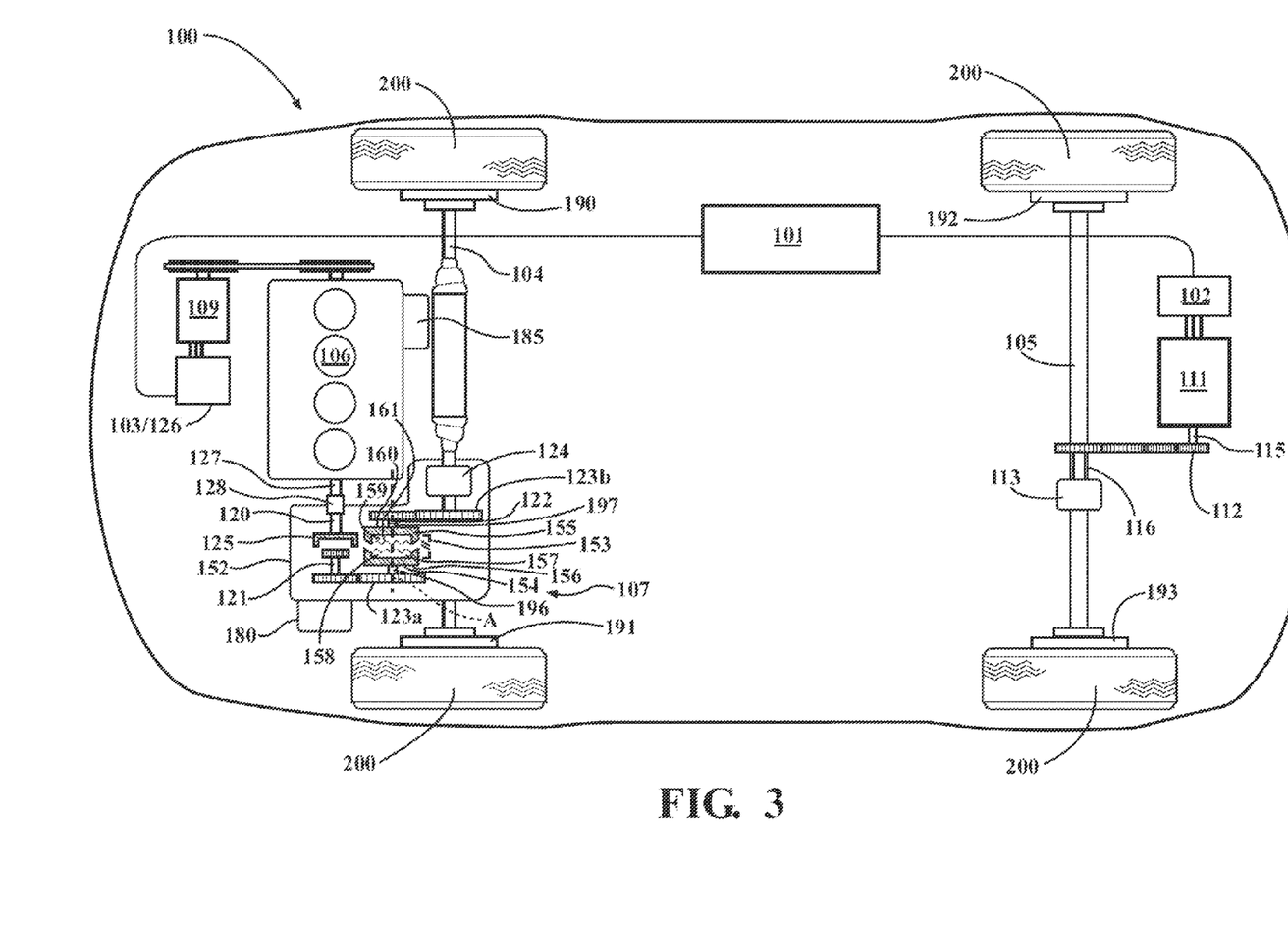
FIG. 3 is an aerial schematic view of a vehicle including a third example configuration of the disconnect clutch with a synchronizer.

Referring generally to FIGS. 1-3, an example vehicle 100 is shown. The vehicle 100 may include a vehicle battery 101, a first power inverter module 102, a second power inverter module 103, a front axle 104, and a rear axle 105. Each of the respective front and rear axles 104, 105 may include opposing ends 190, 191, 192, 193. The front axle may include a first front axle end 190 and a second front axle end 191. The rear axle 105 may include a first rear axle end 192 and a second rear axle end 193. Each of the opposing ends 190, 191, 192, 193 may be configured to receive and engage a plurality of wheels 200 disposed or positioned on each of the respective opposing ends 190, 191, 192, 193. Each of the respective front axle 104 and rear axle 105 may be configured as output shafts for powering the vehicle 100. The vehicle battery 101 may be electrically interconnected with each of the respective first and second power inverter modules 102, 103.

The rear axle 105 may be an e-axle driven or powered by an electric motor assembly, in electric motor only or EV mode. The electric motor assembly may include the first power inverter module 102, an electric motor 111, a rear axis transfer mechanism 112, and a rear differential 113. The first power inverter module 102 may be coupled to the vehicle battery 101 and the electric motor 111 by an electrical connection. An electric motor output 115 may be configured to couple the electric motor 111 and the rear axis transfer mechanism 112. The rear axis transfer mechanism 112 may include at least one gear set, a chain and sprockets, or a planetary gear set. The electric motor output 115 may be configured to receive torque generated by the electric motor 111 and transmit torque to the rear axis transfer mechanism 112. The rear axis transfer mechanism 112 may be configured to receive torque from the electric motor output 115 and may be further configured transmit torque a rear axis transfer mechanism output 116. The rear axis transfer mechanism output 116 may be configured to receive torque from the rear axis transfer mechanism 112 and further configured to transmit torque to the rear differential 113. The rear differential 113 may be configured to receive torque from rear axis transfer mechanism output 116 and further configured to transmit torque to the rear axle 105 to propel the vehicle 100 in EV mode.

The front axle 104 may be driven or powered, in hybrid operating mode, by an energy conversion system 106 engagable with an automatic or manual vehicle transmission 107. The energy conversion system 106 may be a gasoline or diesel powered internal combustion engine or other energy conversion system 106 known in the art, coupled with a BAS electric motor 109. The engine 106 may be controlled by and interconnected with an engine control unit 185. The BAS electric motor 109 may be electrically interconnected with a hybrid control unit 126 and the second power inverter module 103.

The vehicle transmission 107 may be contained in a transmission housing 152. The vehicle transmission 107 may include a rotatable input shaft member 120; the dog clutch assembly 150; a moveable clutch apply mechanism 122; at least one front axis transfer mechanism 123; at least one rotatable front axis transfer mechanism input 121; an at least one front axis transfer mechanism output 196; a front differential 124; a base transmission 125, which includes a plurality of range clutches, gears, and shafts; and a transmission control unit 180 (collectively the transmission components 120, 121, 122, 123, 124, 125, 150, 180, 196).

The hybrid control unit 126 may be configured to engage the electric BAS motor 109, which may be configured to crank the engine or other energy conversion system 106. The energy conversion system 106 is operable to generate a rotational force or torque suitable for rotating a crankshaft 127 that is configured to be coupled with the input shaft 120 of the vehicle transmission 107. The crankshaft 127 may be coupled to the transmission input shaft 120 by a fluid or mechanical coupling 128 such as a torque converter or clutch and fly wheel.

The transmission components 120, 121, 122, 123, 124, 125, 150, 180, 196 may be configured in several ways within the transmission housing 152. Four example embodiments of the dog clutch assembly 150 are provided in FIGS. 1-4. In all four example embodiments, shown in FIG. 1-4, the clutch assembly 150 is configured to engage (in hybrid mode) or disengage (in EV mode) the base transmission 125 from the front differential 124. The placement of the dog clutch assembly 150 within the transmission 107, in any given configuration, allows for the balancing of desired resultant factors, which may include reduction in spin loss, increase in fuel economy, transmission lubrication, and packaging efficiency. Further, in all four example embodiments, the base transmission 125 may be configured to interconnect and receive torque from the rotatable transmission input shaft 120.

In one example embodiment, shown in FIG. 1, reduction in spin losses and fuel economy are maximized. As shown in FIG. 1, the base transmission 125 may be configured to interconnect and receive torque from the rotatable transmission input shaft 120. The base transmission 125 may include a plurality of wet friction clutches with hydraulic actuation or the like. The base transmission 125 may be further configured to transfer torque to the at least one front axis transfer mechanism input 121.

The at least one front axis transfer mechanism input 121 may be configured to receive torque from the base transmission 125 and may be further configured to transfer torque to the at least one front axis transfer mechanism 123.

The at least one front axis transfer mechanism 123 may include a planetary gear set, a chain and sprockets, reduction gearing or the like. The at least one front axis transfer mechanism 123 may be configured to receive torque from the at least one front axis transfer mechanism input 121, and may be further configured to transmit torque to the at least one front axis transfer mechanism output 196.

The at least one front axis transfer mechanism output 196 may be configured to receive torque from the front axis transfer mechanism 123 and further to transmit torque to the dog clutch assembly 150.

The dog clutch assembly 150 is configured to engage the base transmission 125 with the front differential 124, allowing torque from the engine to be transmitted to the front axle 104 through the front differential 124. The clutch assembly 150 may include a synchronizer 153, and the dog clutch having a dog clutch hub 154, and a dog clutch apply plate 155. The moveable clutch apply mechanism 122 is configured to engage the dog clutch hub 154 with the dog clutch apply plate 155.

The synchronizer 153 may be configured to engage and synchronize the components of the base transmission 125 and the front differential 124, creating a coasting or quasi-neutral gear state in the transmission 107.

The dog clutch hub 154 may include a first hub surface 156 and a second hub surface 157. The second hub surface 157 may include a first mechanical engagement feature 158 such as teeth, configured to extend axially from the second hub surface 157. The dog clutch apply plate 155 may include a first plate surface 160 and a second plate surface 159. The first plate surface 160 may include a second mechanical engagement feature 161 such as teeth, configured to extend axially from the second plate surface 159. Each of the respective first mechanical engagement feature 158 and second mechanical engagement feature 161 are configured to form a mechanical engagement or interlock with one another, when the dog clutch is engaged.

The clutch apply mechanism 122 is configured engage or disengage the dog clutch hub 154 and dog clutch apply plate 155 upon a signal from a controller such as a the transmission control unit 180, during a transition from a present operating mode to a target operating mode. The transmission control unit 180 is configured to signal the presence of an initiation event which can include a driver induced acceleration request, a torque threshold event, or a battery depletion event. The clutch apply mechanism 122 may include a clutch apply piston (not shown), which may be hydraulically actuated. The dog clutch apply piston (not shown) may be configured to axially displace the dog clutch apply plate 155, thereby engaging each of the respective first and second the mechanical engagement features 158, 161. The clutch apply mechanism 122 may also include a clutch return spring (not shown) configured to disengage each of the respective first and second the mechanical engagement features 158, 161, upon the release of the clutch apply piston (not shown).

In FIG. 1, the dog clutch assembly 150 is configured to engage or disengage the base transmission 125 and the front differential 124 at the juncture between the front differential 124 and the at least one front axis transfer mechanism 123. The dog clutch assembly 150 in this example, may be configured to receive torque from the at least one front axis transfer mechanism output 196 and may be further configured to transmit torque to the front differential 124 when engaged.

The front differential 124 may be configured to receive torque from the dog clutch assembly when engaged. The front differential 124 may be further configured to transmit torque to the second output shaft or front axle 104. The torque transmitted to the front axle 104 from the front differential 124 may be transferred to the wheels 200 to propel the vehicle 100 in hybrid operating mode.

The example embodiment shown in FIG. 1 maximizes the reduction of spin losses and fuel economy as the at least one front axis transfer mechanism 123, which may include a chain and sprockets, reduction gearing, or a planetary gearing set does not rotate freely with the output shaft or front axle 104, when the dog clutch assembly 150 is disengaged. The at least one axis transfer mechanism 123 is only engaged and allowed to rotate in hybrid mode.

In a second example embodiment, shown in FIG. 2, transmission lubrication during EV mode is maximized while maintaining the desired reduction in spin loss reduction and sufficient fuel economy. In FIG. 2, the dog clutch assembly 150 is configured to engage or disengage the base transmission 125 and the front differential 124 at the juncture between the base transmission 125 and the at least one front axis transfer mechanism 123. The dog clutch assembly 150, in this example, may be configured to receive torque from the base transmission 125 and further configured to transmit torque to the at least one axis transfer mechanism input 121.

The dog clutch assembly 150 is configured to selectively engage the base transmission 125 and the at least one front axis transfer mechanism 123, in hybrid mode. The dog clutch assembly 150 is configured to selectively disengage the base transmission 125 from the at least one front axis transfer mechanism 123, in EV mode.

The example embodiment shown in FIG. 2 maximizes the transmission lubrication, while the vehicle 100 is powered in EV mode, while maintaining the desired reduction in spin loss reduction and sufficient fuel economy, as the at least one front axis transfer mechanism 123, which may include a chain and sprockets, reduction gearing, or a planetary gear set continues to rotate with the output shaft or front axle 104 in EV mode as well as in hybrid mode.

In a third example embodiment, shown in FIG. 3, transmission lubrication in EV mode and potential packaging space are maximized while still maintaining the desired reduction in spin loss and sufficient fuel economy. In FIG. 3, the dog clutch assembly 150 is configured to engage or disengage the base transmission 125 and the front differential at the juncture between two or more front axis transfer mechanisms 123a, 123b, aligned along a transfer axis A. The front axis transfer mechanisms 123a, 123b may include reduction gearing.

The initial front axis transfer mechanism 123a may be configured to receive torque from the first at least one front axis transfer mechanism input 121 and may be further configured to transmit torque to the first at least one front axis transfer mechanism output 196.

The first at least one front axis transfer mechanism output 196 is configured to receive torque from the initial at least one front axis transfer mechanism 123a and may be further configured to transmit torque to the dog clutch assembly 150.

The dog clutch assembly 150 may be configured to receive torque from the first at least one front axis transfer mechanism output 196 and may be further configured to transmit torque to a secondary front axis transfer mechanism input 197.

The secondary front axis transfer mechanism input 197 may be configured to receive torque from the dog clutch assembly 150 and further configured to transfer torque to the secondary front axis transfer mechanism 123b.

The secondary front axis transfer mechanism 123b may be configured to receive torque from the secondary front axis transfer mechanism input 197 and may be further configured to transmit torque to the front differential 124.

In this example, as shown in FIG. 3, the dog clutch assembly 150 is configured to selectively engage the initial front axis transfer mechanism 123a and the secondary front axis transfer mechanism 123b in hybrid mode. The dog clutch assembly 150 is configured to selectively disengage the initial front axis transfer mechanism 123a and the secondary front axis transfer mechanism 123b, in EV mode. Further, this configuration maximizes the transmission lubrication during EV mode and potential packaging space, while still maintaining the desired reduction in spin loss and sufficient fuel economy. The secondary front axis transfer mechanism 123b, which may include reduction gearing, continues to rotate with the output shaft or front axle 104 in EV mode. Additional packaging space is also created along the stand alone transfer axis A.

Figure 4:
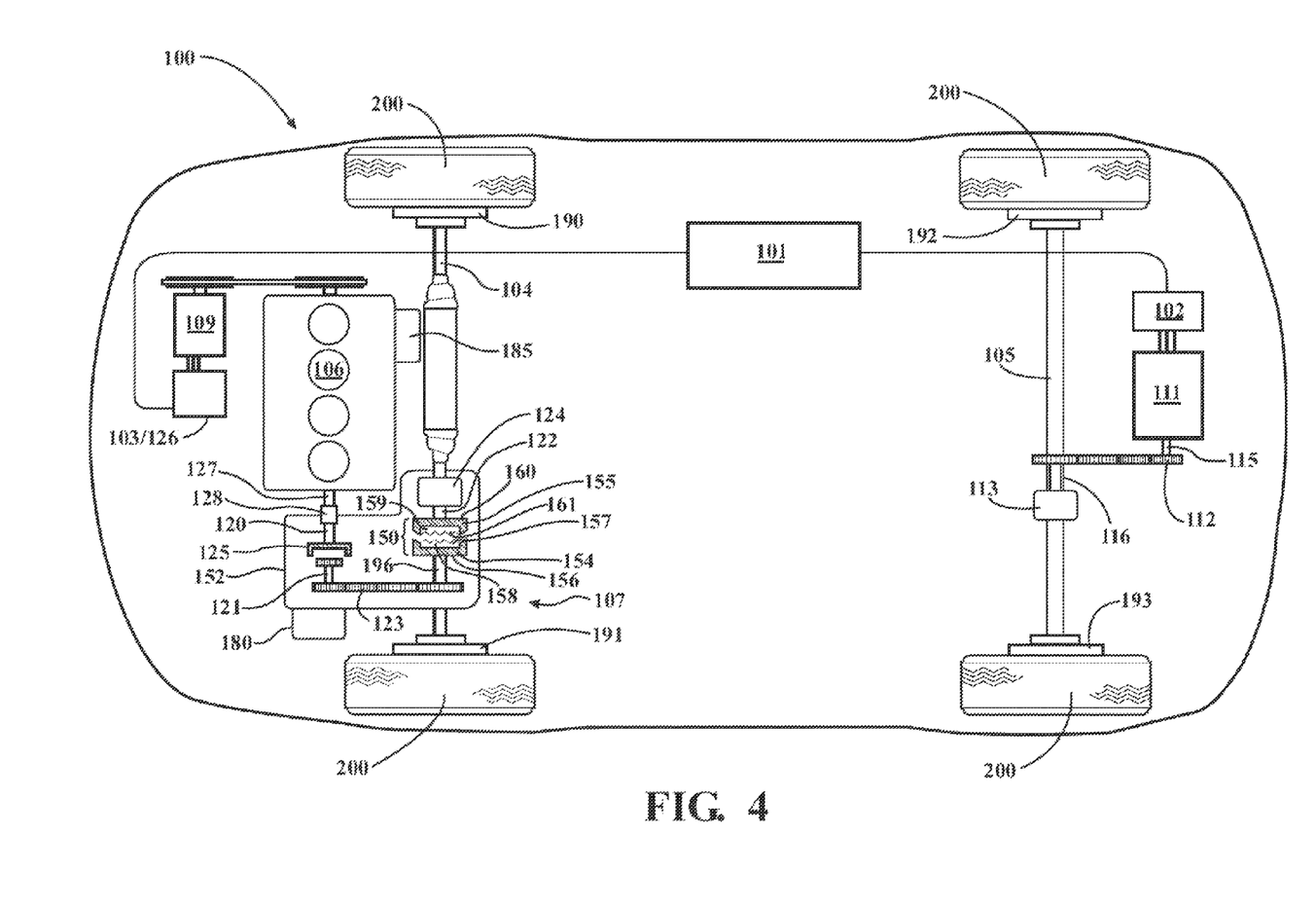
FIG. 4 is an aerial schematic view of a vehicle including a fourth example configuration of the disconnect clutch without a synchronizer.

In the fourth example embodiment, shown in FIG. 4, reduction in spin losses and fuel economy, as well as potential packaging space are maximized. The dog clutch assembly 150 is configured to engage or disengage the base transmission 125 and the front differential 124 at the juncture between the front differential 124 and the at least one front axis transfer mechanism 123, without a synchronizer 153. The dog clutch assembly 150 in this example, may be configured to receive torque from the at least one front axis transfer mechanism output 196 and may be further configured to transmit torque to a front differential 124 when engaged.

The front differential 124 may be configured to receive torque from the dog clutch assembly 150 when engaged; the front differential 124 may be further configured to transmit torque to the second output shaft or front axle 104. The torque transmitted to the front axle 104 from the front differential 124 may be transferred to the wheels 200 to propel the vehicle 100 in hybrid operating mode.

The example embodiment shown in FIG. 4 maximizes the reduction of spin losses and fuel economy. Potential packaging space is also maximized, due to the lack of a synchronizer 153. In the absence of a synchronizer 153, the transmission range clutches within the base transmission 125 will synchronize the relative rotational speeds of dog clutch hub 154 and the dog clutch apply plate 155. However, in the absence of a synchronizer 153 there is a risk of disturbance or grinding, when the synchronization of the relative rotational speeds of the base transmission 125 and front differential 124 are not perfectly synchronized. In the event of a less than perfect synchronization, the capacity of the transmission range clutches, within the base transmission 125, will be reduced to allow slip and mitigate disturbance or grinding.

Figure 5:
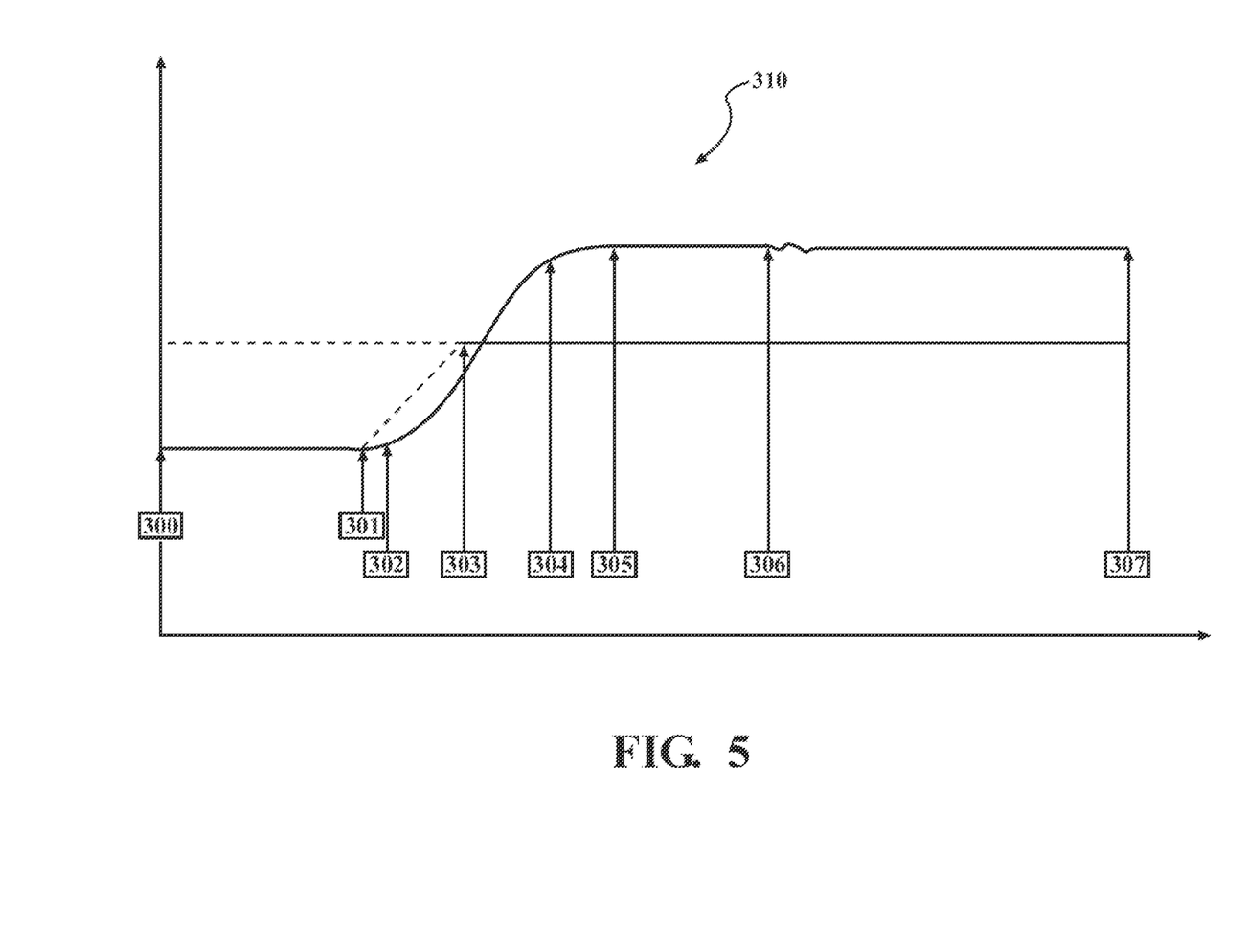
FIG. 5 is a graph of an example speed and acceleration profile of the engine, transmission, and dog clutch during the transition from a present operating mode to a target operating mode.

FIG. 5 illustrates an example process 310 that may define the transfer from EV mode to hybrid operating mode. At block 300, the vehicle 100 is driving in EV mode.

At block 301, an initiation event is detected, prompting the transmission control unit 180 to signal the transfer from EV mode to hybrid drive mode. The transmission control unit 180 may engage the synchronizer 153 and the dog clutch hub 154. The synchronizer 153 is configured to engage and synchronize the relative rotational speeds of the base transmission 125 and the front differential 124, creating a coasting or quasi-neutral gear state.

At block 302, the second power inverter module 103 starts the electric BAS motor 109, which begins to crank the engine 106.

At block 303, the synchronizer 153 completes the synchronization of the relative rotational speeds of the base transmission 125 and the front differential 124.

When sufficient speed synchronization is achieved at block 303, the dog clutch hub 154 is configured to engage and the clutch-apply piston (not shown) of the clutch apply mechanism 122 is energized by a controllable supply of pressurized hydraulic fluid, and axially displaces the dog clutch apply plate 155 until the first mechanical engagement feature 158 and the second mechanical engagement feature 161 are adapted to form an interlocking mechanical engagement, as shown at block 304.

Following the full engagement of the clutch assembly 150, the engine 106 and transmission 107 reach a sufficiently synchronous speed for the desired gear state, as shown at block 305.

Once a sufficiently synchronous speed is achieved, creating a coasting or neutral gear state, the base transmission 125 engages, at block 306. Once the base transmission 125 engages the energy conversion system 106 and transmission 107, are configured to transmit torque to the front axle or output shaft 104 to propel the vehicle 100 in hybrid drive mode, shown at block 307.

When an initiation event signaling a change in operating mode from hybrid drive mode to EV mode is identified, the transmission control unit 180 is configured to signal the electric motor 111 to take over the torque demand, and the engine 106 is configured to ramp down and unload to open the base transmission 125 creating a neutral or coasting transmission state and cutting fuel to the engine 106 rendering the speed of the electric BAS motor 109 to zero. The clutch return spring (not shown) of the clutch apply mechanism 122 is configured to energize and axially displace the dog clutch apply plate 155 upon release of the piston (not shown), thereby releasing and disengaging the dog clutch, and decoupling the base transmission 125 and the front differential 124, allowing the vehicle to be propelled in EV mode by the electric motor assembly 110 transmitting torque to the rear e-axle 105.

A method of transitioning a hybrid vehicle 100 between a present operating mode and a target operating mode is provided. The method comprises the steps of detecting an oncoming initiation event based on a transition from the present operating mode to the target operating mode, wherein the present operating mode is an EV operating mode and the target operating mode is a hybrid operating mode; signaling a desired change from the present operating mode to the target operating mode, using a controller such as a the hybrid control unit 126; applying a synchronizer 153 to synchronize a base transmission 125 and a front differential 124, wherein the base transmission 125 includes a plurality of range clutches, gears, and shafts; starting a BAS motor 109 to crank an engine 106; engaging a dog clutch assembly 150 to selectively couple the base transmission 125 with the front differential 124; engaging the base transmission 125; and powering the front differential 124 in the target operating mode with the engine 106.

A method of transitioning a hybrid vehicle 100 between a present operating mode and a target operating mode is also provided. The method comprises the steps of detecting an oncoming initiation event based on a transition from a present operating mode to a target operating mode, wherein the present operating mode is a hybrid operating mode and the target operating mode is an EV operating mode; signaling a desired change from the present operating mode to the target operating mode, using a controller such as a hybrid control unit 126; reducing the torque output of an engine 106 to zero and increasing the torque output of an electric motor 111; disengaging a base transmission 125, wherein the base transmission 125 includes a plurality of range clutches, gears, and shafts; cutting fuel to the engine 106; reducing the speed of the engine 106 to zero using a BAS motor 109; disengaging a dog clutch assembly 150 to decouple the base transmission 125 and a front differential 124; powering a rear differential 113 in the target operating mode with the electric motor 111.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
   a base transmission including a plurality of transmission range clutches, gears, and shafts;

a front differential selectively coupled to the base transmission;
at least one front axis transfer mechanism configured to transmit torque from the base transmission to the front differential;
a dog clutch assembly including:
  a synchronizer configured to synchronize the base transmission and the front differential; and
  a dog clutch hub having a first hub surface and second hub surface, and at least one mechanical engagement feature that extends from the second hub surface, the dog clutch hub being configured to be coupled with the synchronizer;
  a dog clutch apply plate having a first plate surface, a second plate surface, and at least one mechanical engagement feature that extends from the second plate surface;
a clutch apply mechanism configured to axially displace the dog clutch apply plate and engage or disengage the dog clutch apply plate with the dog clutch hub;
wherein the dog clutch assembly is configured to selectively couple the base transmission and the front differential when the dog clutch apply plate is engaged with the dog clutch hub; and
wherein the dog clutch assembly is configured to selectively decouple the base transmission and the front differential when the dog clutch apply plate is disengaged from the dog clutch hub to allow the base transmission to operate in a low loss state.

2. The vehicle of claim 1, wherein a transmission housing is configured to house each of the respective base transmission, the least one front axis transfer mechanism, the front differential, the synchronizer, and the dog clutch assembly.

3. The vehicle of claim 1, wherein the plurality of transmission range clutches of the base transmission are hydraulically actuated, wet friction clutches.

4. The vehicle of claim 1, wherein the at least one front axis transfer mechanism includes a chain and sprockets.

5. The vehicle of claim 1, wherein the dog clutch assembly is configured to selectively couple the base transmission and the front differential by creating a mechanical interconnection between the least one front axis transfer mechanism and the front differential.

6. The vehicle of claim 1, wherein the dog clutch assembly is configured to selectively couple the base transmission and the front differential by creating a mechanical interconnection between the base transmission and the at least one front axis transfer mechanism.

7. The vehicle of claim 1 further comprising:
an initial axis transfer mechanism input;
at least one initial axis transfer mechanism configured to receive torque from the at least one initial transfer mechanism input;
at least one initial axis transfer mechanism output configured to receive torque from the initial axis transfer mechanism and transmit torque to the dog clutch assembly;
at least one secondary axis transfer mechanism input configured to receive torque from the dog clutch assembly;
at least one secondary axis transfer mechanism configured to receive torque from the at least one secondary axis transfer mechanism input and further configured to transmit torque to the front differential;
wherein the dog clutch assembly is positioned along a stand-alone transfer axis, the dog clutch assembly configured to selectively couple the base transmission and the front differential by creating a mechanical interconnection between the initial at least one front axis transfer mechanism and further configured to transmit torque to the secondary at least one front axis transfer mechanism; and
wherein the dog clutch assembly is positioned along a stand-alone transfer axis, the dog clutch assembly configured to disengage the base transmission and the front differential at a mechanical interconnection between the initial at least one front axis transfer mechanism and the secondary at least one front axis transfer mechanism, to allow the base transmission to operate in a low loss state.

8. The vehicle of claim 7, wherein the at least one initial axis transfer mechanism and the at least one secondary axis transfer mechanism comprise reduction gears.

9. The vehicle of claim 1 wherein the vehicle is a hybrid vehicle configured to operate in each of a hybrid operating mode and an electric only operating mode.

10. The vehicle of claim 9 wherein the vehicle operates in the hybrid operating mode when the base transmission and the front differential are selectively coupled by the dog clutch assembly, such that the dog clutch apply plate is engaged with the dog clutch hub.

11. The vehicle of claim 9 wherein the vehicle operates in the electric only operating mode when the base transmission and the front differential are selectively decoupled by the dog clutch assembly, such that dog clutch apply plate is disengaged from the dog clutch hub.

12. The vehicle of claim 9 further including:
a front axle having a first front axle end and a second front axle end, the front axle having one of a plurality of wheels disposed at each of the respective first front axle end and second front axle end;
a rear axle having a first rear axle end and a second rear axle end, the rear axle having one of a plurality of wheels disposed at each of the respective first rear axle end and second rear axle end;
an engine configured to transmit torque to the front axle via the front differential and drive each of the plurality of wheels disposed at the first front axle end and the second front axle end;
a belt alternator starter (BAS) motor configured to crank the engine;
an electric motor having an electric motor output, the electric motor configured to transmit torque to from the electric motor output to a rear differential to power the rear axle and drive each of the plurality of wheels disposed at the first rear axle end and the second rear axle end; and
a vehicle battery electrically interconnected with at least the BAS motor via a first power inverter module and with the electric motor via a second power inverter module.

13. The vehicle of claim 12 wherein the rear axle is an electronically-controlled rear e-axle powered by the electric motor and vehicle battery.

14. The vehicle of claim 12 further comprising:
a transmission control unit configured to control the dog clutch assembly and the clutch apply mechanism to effectuate the coupling and decoupling of the base transmission and the front differential;
an engine control unit configured to control the speed and torque output of the engine; and
a hybrid control unit configured to:
  detect an initiation event, which indicates a desired transition from a present operating mode to a target operating mode, wherein the initiation event is one of a driver induced acceleration request, a torque threshold event, and a battery depletion event; and signal a transition from the present operating mode to the target operating mode.

15. The vehicle of claim 14 wherein the present operating mode is the electric only operating mode and the target operating mode is the hybrid operating mode.

16. The vehicle of claim 14 wherein the present operating mode is the hybrid operating mode and the target operating mode is the electric only operating mode.

17. The vehicle of claim 15 wherein the hybrid control unit is further configured to:
   signal the transmission control unit to apply the synchronizer to synchronize the relative rotational speeds of each of the base transmission and the front differential;
   signal the BAS motor to start and to crank the engine;
   signal the transmission control unit to engage the dog clutch assembly to selectively couple the base transmission and the front differential;
   determine when the engine is operating at a speed sufficiently synchronous with the base transmission for a desired gear state; and
   signal the transmission control unit to engage the base transmission after the engine reaches the speed sufficiently synchronous with the base transmission for the desired gear state.

18. The vehicle of claim 16 wherein the hybrid control unit is further configured to:
   signal the engine control unit to reduce the torque output of the engine to zero;
   signal the transmission control unit to increase the torque output of the electric motor;
   signal the transmission control unit to disengage the base transmission;
   signal the engine control unit to cut fuel to the engine;
   signal the engine control unit to reduce the speed of the engine to zero utilizing the BAS motor; and
   signal the transmission control unit to disengage the dog clutch assembly in order to decouple the base transmission and the front differential.

* * * * *